United States Patent
Courtney et al.

(10) Patent No.: US 6,176,898 B1
(45) Date of Patent: Jan. 23, 2001

(54) METHOD AND SYSTEM FOR COLLECTING AND HANDLING DUST IN A PAPERMACHINE ENVIRONMENT

(75) Inventors: Kevin Courtney; Jerry Klymenko; Peter Kevin Wicklund; Philip Ponka, all of Thunder Bay (CA)

(73) Assignee: Valmet, Inc., Charlotte, NC (US)

( * ) Notice: Under 35 U.S.C. 154(b), the term of this patent shall be extended for 0 days.

(21) Appl. No.: 09/289,411

(22) Filed: Apr. 9, 1999

(51) Int. Cl.⁷ .................................................. B01D 47/16
(52) U.S. Cl. .................. 95/216; 95/219; 95/222; 96/273; 96/322; 162/272
(58) Field of Search .................. 95/149, 187, 199, 95/200, 201, 192, 224, 216, 219; 96/243, 234, 265, 271, 272, 273, 322, 355; 162/272

(56) References Cited

U.S. PATENT DOCUMENTS

| | | | |
|---|---|---|---|
| 2,825,430 | * 3/1958 | Hooper | 162/272 |
| 3,063,221 | * 11/1962 | Ortfies et al. | 96/265 |
| 3,763,634 | * 10/1973 | Alliger | 96/271 |
| 4,019,953 | * 4/1977 | Nystrom | 162/272 |
| 4,272,499 | * 6/1981 | Cason et al. | 162/272 |
| 5,088,913 | * 2/1992 | Chambers | 95/224 |
| 5,219,585 | * 6/1993 | Shealy et al. | 95/149 |
| 5,635,031 | * 6/1997 | Enkvist | 162/272 |
| 5,800,679 | * 9/1998 | Lindstrom et al. | 162/272 |
| 5,878,462 | * 3/1999 | Linden et al. | 162/272 |
| 6,014,790 | * 1/2000 | Smith et al. | 96/243 |
| 6,068,735 | * 5/2000 | Marchal | 162/272 |

* cited by examiner

Primary Examiner—Duane S. Smith
(74) Attorney, Agent, or Firm—Michael E. McKee

(57) ABSTRACT

An improved process and system for collecting and handling dust in a papermaking machine environment wherein dust-laden air is drawn into and moves along an elongated collector by way of a vacuum-generating source connected to the collector involves the introduction of water into the collector so that the introduced water becomes entrained by the dust-laden air moving through the collector and wet-scrubs the dust-laden air upon entering the collector. With the dust being wet-scrubbed upon exiting the collector, the likelihood of ductwork fouling is substantially eliminated, and the risk of fire in the ductwork downstream of the collector is appreciably reduced.

19 Claims, 2 Drawing Sheets

METHOD AND SYSTEM FOR COLLECTING AND HANDLING DUST IN A PAPERMACHINE ENVIRONMENT

BACKGROUND OF THE INVENTION

This invention relates generally to the collection and handling of dust and more particularly is concerned with the means and methods for collecting dust in the environment of a papermaking machine and for transporting the dust from the machine environment after the dust has been collected.

In a room in which a papermaking machine is used for making tissue, a relatively large amount of dust (including cellulose fiber, clay, starch and other chemical dust) may be released into the surrounding air by the papermaking process, and this released dust can create operating hazards, worker health hazards, and is likely to migrate to various areas of the room and create a cleanliness (e.g. machine hygiene) problem or increase the risk of fire at those areas. Heretofore, attempts to control the amount of dust released into a papermaking machine room involved the capturing of dust adjacent the source of creation (referred to herein as primary dust control) and the containing of dust after the dust has become airborne (referred to herein as secondary dust control). The systems and methods with which this invention is to be compared include the systems and methods employed for primary dust control and for secondary dust control.

Conventional primary and secondary dust control schemes commonly involve a fan or similar means for creating a vacuum at a collector, or vacuum head, through which dust and/or dust-laden air is drawn into the interior of the collector and subsequently transported from the collector by way of attending ductwork. To effectively carry the dust particles within the airstream, relatively high transport velocities are employed within the ductwork. In addition, wet-scrubbing equipment is commonly connected to the ductwork at a site downstream of the collector for wet-scrubbing the dust-laden air in a manner which separates dust from the air so that the air which is subsequently discharged to the atmosphere is relatively clean.

Limitations and disadvantages attending the conventional primary and secondary dust control schemes of the afore-described class relate to system operation, safety from fires, and cost. For example, the likelihood is high that the ductwork through which the dust and dust-laden air is transported will become fouled, or clogged, with dust so that design volumetric flow rates cannot be maintained. Furthermore, the cleanliness of the interior of the collectors and the attending ductwork can be adversely affected by moisture present within the dust-laden airstream. Low moisture levels will cause the dry dust particles to attach themselves to each other and/or the interior surface of the ductwork. Low moisture levels in the airstream are typically caused by intermittent introduction of water or high humidity levels at the inlet of the collector. Further still, water may be inadvertently and intermittently introduced into the inlets of the collectors during a cleanup operation performed around the machine. Consequently, the collectors and attending ductwork of these conventional dust control schemes require frequent and costly cleaning.

Furthermore, ductwork fouling, in conjunction with the high air flows, creates a situation in which a fire, if ignited (e.g. by mechanical friction or static charges) and not extinguished immediately, could propagate and damage components throughout the system, as well as present a high risk to human safety. Fire suppression equipment can be installed within the system to reduce the damage and safety risks of ductwork fires, but such equipment is relatively expensive, is rarely one-hundred percent effective, and must be routinely maintained in order to preserve the operating effectiveness that it possesses.

Further still, wet-scrubbing equipment which is commonly employed with conventional dust control systems is relatively expensive, and its cost, along with the cost of associated access platforms, support structures and installation, is likely to comprise a significant portion of the capital cost of the entire dust-collection system.

It is an object of the present invention to provide a new and improved means and method for collecting dust in the environment of a papermaking machine and which overcomes the disadvantages and limitations associated with conventional dust-collection schemes.

Another object of the present invention is to provide such a means and method which can be used for either primary or secondary dust control.

Still another object of the present invention is to provide such a means and method which reduces the likelihood of ductwork fouling, reduces the risk of a ductwork fire, and obviates the need for costly fire suppression equipment.

Yet another object of the present invention is to provide such a means and method which permits the relatively costly wet-scrubbing equipment to be replaced with a less costly droplet separator.

A further object of the present invention is to provide such a means which is uncomplicated in construction yet effective in operation.

SUMMARY OF THE INVENTION

This invention resides in a improved process and system for collecting and handling dust in a papermaking environment wherein dust-laden air is drawn into and moves along an elongated collector by way of a vacuum-generating source connected to the collector.

The improvement of the process includes a step of introducing water into the collector so that the introduced water wet-scrubs the dust-laden air upon entering the collector, and the improvement of the system includes means for introducing the water into the collector.

DETAILED DESCRIPTION OF AN ILLUSTRATIVE EMBODIMENT

Figure 1:
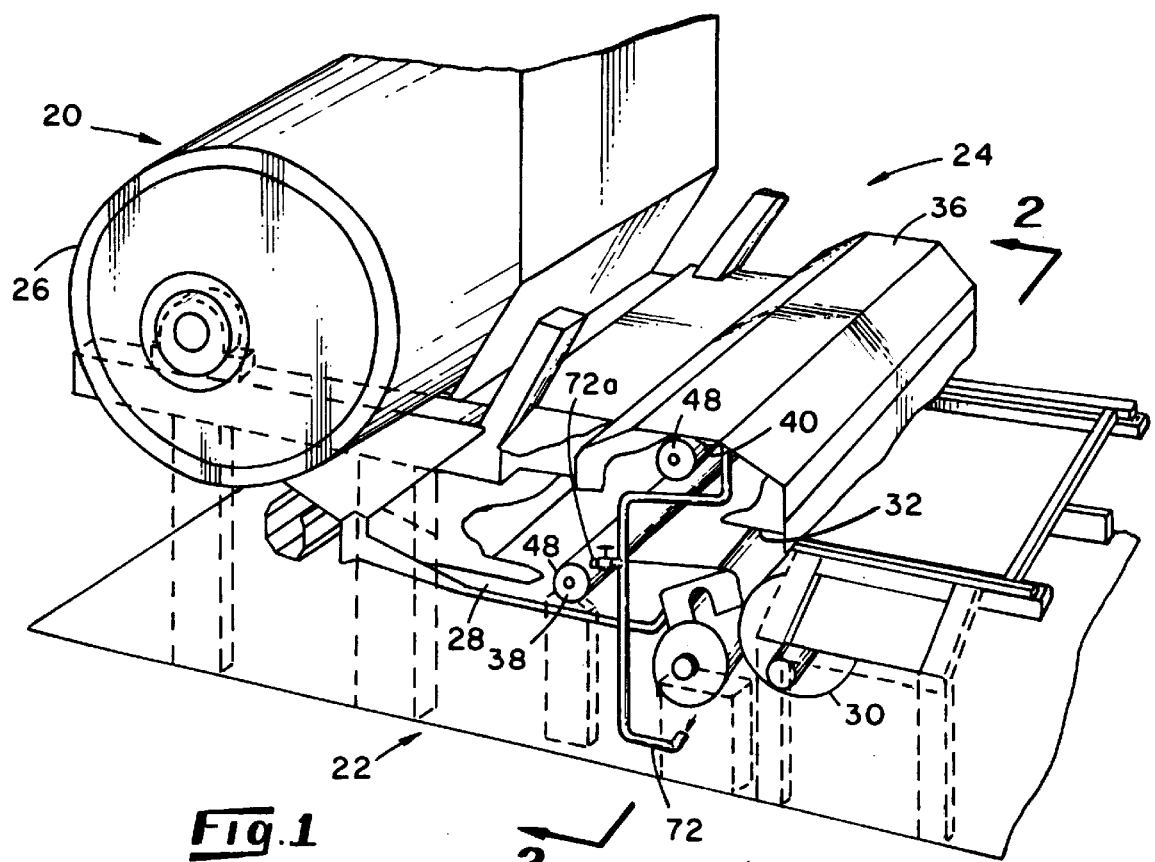
FIG. 1 is a perspective view of a fragment of a papermaking machine with which an embodiment of a dust collection and handling system is, employed.
Figure 2:
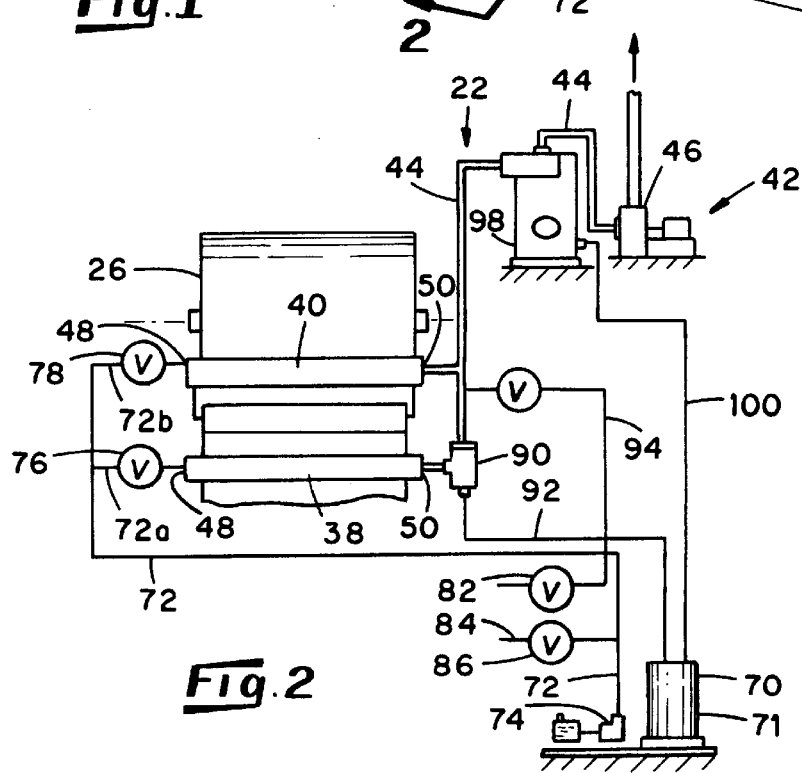
FIG. 2 is a cross-sectional view of a fragment of the FIG. 1 papermaking machine as viewed generally along line 2—2 of FIG. 1 and schematically illustrating the operating components of the dust collection and handling system employed with the FIG. 1 machine.

Turning now to the drawings in greater detail and considering first FIGS. 1 and 2, there is shown a typical environment, generally indicated 20, within which a dust collecting and handling system, generally indicated 22, is employed to carry out an embodiment of the process of the present invention. In particular, the environment 20 is that of a papermaking machine room within which a papermaking machine 24 is housed. The depicted papermaking machine 24 is a tissue-making machine including a series of rotating drums 26 (only one shown in FIGS. 1 and 2) across which a moving web 28 of tissue paper is routed before being wound about a roll 30 and is known to generate a relatively large amount of dust (including cellulose fiber, clay, starch and other chemical dust) during its operation. If permitted to be released into the air which surrounds the machine 24, this dust could create operating hazeards, worker health hazards, and could migrate to various areas of the room and create a cleanliness (e.g. machine hygiene) problem or increase the risk of fire at those areas.

To help reduce the amount of dust which is permitted to be released into the air which surrounds the machine 24, the dust collecting and handling system 22 acts in a primary dust control capacity for collecting dust directly from the surface of the moving web 28 (e.g. a site from which a large amount of dust could otherwise be released into the surrounding air) and in a secondary dust control capacity for containing and collecting dust after it has become airborne. In the depicted system 22, a canopy hood 36 is supported about so as to envelope the end of the moving web 28 adjacent the roll 30 and thereby substantially confine the air disposed in the vicinity of the roll-end of the moving web 28. It is from within this confined area, indicated 32, that the system 22 extracts dust and dust-laden air for subsequent handling.

With reference still to FIG. 2, the system 22 includes a pair of collectors 38, 40, means, indicated 42, for generating a vacuum within the interior of the collectors 38, 40 so that dust and dust-laden air is drawn into the interior of the collectors 38, 40 from the confined area 32, and attending ductwork 44 joining the collectors 38, 40 and the vacuum-generating source 42. In the depicted system 22, the vacuum-generating source 42 includes a motor-driven centrifugal fan 46 connected within the ductwork 44 at a location downstream of the collectors 38, 40. The ductwork 44 appropriately connects the collectors 38 (which are arranged in parallel) to the inlet (i.e. low-pressure side) of the fan 46 so that during fan operation, the interiors of the collectors 38, 40 are exposed to the low pressure created at the fan inlet.

Figure 3:
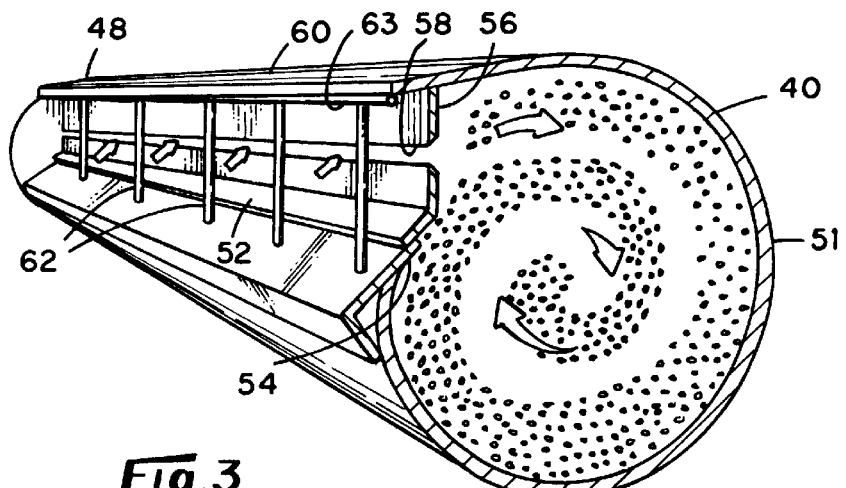
FIG. 3 is a perspective view, shown partially in section, of one of the collectors of the dust collecting and handling system of FIG. 2.
Figure 4:
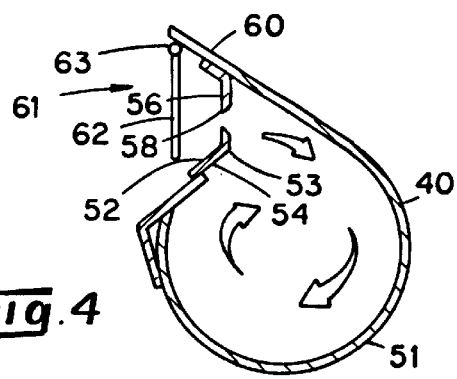
FIG. 4 is a radial cross-sectional view of the collector of FIG. 3.

With reference to FIGS. 2–4, each collector 38 or 40 is substantially rounded in form having a cylindrical body portion 51 and is elongated in shape having two opposite ends 48 and 50. Furthermore, each collector 38 or 40 is substantially circular in cross section so as to provide each collector with smooth, round interior walls and includes a V-shaped inlet portion 52 joined to the body portion 51 so as to extend along a side of the pipe 38 or 40. The V-shaped inlet portion 52 includes two planar legs 54 and 56 which are joined at an apex 53 which is directed inwardly of the collector 38 or 40, and a continuous slot-like inlet opening 58 is defined in one of the legs 56 to provide an inlet for the collector which extends along the entire collector length. Because the leg 56 of the inlet portion 52 along which the inlet 58 is defined is canted, or sloped, with respect to the longitudinal axis of the collector 38 or 40, the inlet 58 opens somewhat tangentially along the interior of the collector, rather than radially inwardly toward the longitudinal axis of the collector. As will be apparent herein, the drawing of air through one end of the collector by the fan 46, in conjunction with this canted orientation of the collector inlet 58 induces a vortex, or helical flow, of air along the length of the collector as air is pulled into the collector interior through the inlet 58. Furthermore, the inlet 58 is bounded by relatively sharp edges to provide a good wet/dry interface and thus reduce any likelihood that dust will accumulate along the inlet edges and thereby clog the inlet 58.

If desired, each collector 38 or 40 can be provided with an overhang portion 60 disposed adjacent the inlet 58 as shown in FIG. 3, and each collector 38 or 40 can be provided with an inlet guard assembly 61 which is comprised of a plurality of vertically-oriented rods 62 arranged parallel to one another and connected to a common horizontal member 63 which is joined to the overhang portion 60 so at to be oriented generally parallel to the longitudinal axis of the collector. These rods 62 are fixedly secured at the tops thereof to the horizontal member 63 so as to be spaced forwardly of the inlet 58 (in a region of lower-velocity air flow) and serve to restrict the intake of broke (e.g. fragments of paper) or other large pieces of debris which are frequently present within a papermaking machine during normal disruptions in paper production. The vertical rods 62 are not supported or attached at the lower ends so that these lower ends are out of contact with the remainder of the collector. This feature allows broke to easily dislodge and freely fall, under the influence of gravity, from the inlet guard assembly 61. To facilitate cleaning of the collector, the guard assembly 61 can be pivotally attached to the overhang 60 to permit the lower ends of the rods 62 of the guard assembly 61 to be manually moved (i.e. swung) about the longitudinal axis of the horizontal member 63 and in a direction forwardly of the inlet 58.

In the depicted dust-handling system 22, each collector 38 or 40 is suitably supported within the confined area 32 (FIG. 1) in a horizontal orientation and at locations therein at which one collector 38 draws dust directly from the surface of the moving web 28 of paper and at which the other collector 40 draws dust-laden air from beneath the canopy hood 36. Consequently, the collector 38 is used in a primary dust control capacity in that it is used to draw dust from a site in the papermachine 24 from which the dust may otherwise become airborne and contaminate the surrounding air, while the other collector 40 is used in a secondary dust control capacity in that it is used collect dust after the dust has become airborne. To this end, the collector 38 is supported across the moving web 28 so that its inlet 58 is directed generally downwardly toward and is disposed in close proximity to the web 28, while the collector 40 is supported in an elevated condition appreciably above the surface of the web 28. Although the position of the inlet 58 of the collector 40 is not as critical as it is in the case of the collector 38, it is preferable that the collector 40 is oriented so that its inlet 58 opens in a direction so that air flow currents induced within the confined area naturally carry the dust, and dust-laden air, toward the inlet 58.

Figure 5:
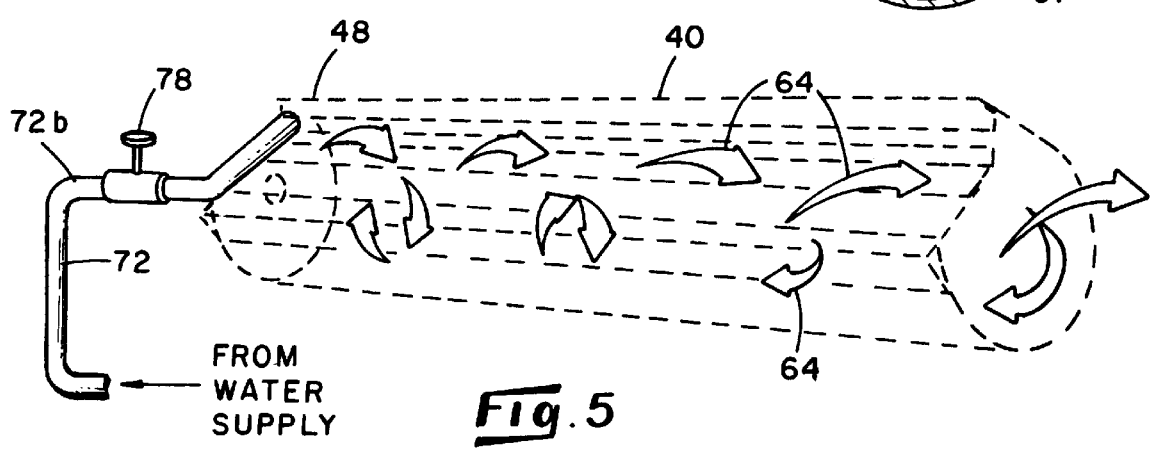
FIG. 5 is a perspective view illustrating the helical flow of dust and water along the length of the collector of FIG. 3 during a dust-collecting operation.

The ductwork 44 is connected to the end 50 of each collector 38 and 40 so that air and dust particles which are drawn into the collector move generally along the interior of the collector 38 or 40 from the end 48 thereof toward the end 50 thereof. As mentioned earlier, the drawing of the air out of the collector 38 or 40, in conjunction with the canted orientation of the collector inlet 58, pulls dust and air into the interior of the collector through the inlet 58 thereof and induces a vortex of air through the collector interior which moves generally toward the end 50 thereof. In other words, as air is pulled into the collector through the inlet 58 thereof, the air enters the collector substantially tangentially with respect thereto and subsequently spirals along the interior walls of the collector toward the collector end 50. Consequently and as exemplified by the flow arrows 64 of FIG. 5, an air vortex is induced within the collector wherein the air vortex rotates about the longitudinal axis of the collector and converges toward the collector end 50. The flow of this induced vortex along the interior walls of the collector is not appreciably (e.g. adversely) affected by the inwardly-directed inlet portion 52.

With reference again to FIGS. 1 and 2, it is a feature of the invention that water is introduced into each collector 38 and 40 at the collector end 48 (i.e. opposite the collector end 50) so that the introduced water becomes entrained by the dust-laden air moving through the pipe and so that dust (i.e. the majority of the dust) of the dust-laden air which exits the collector through the end 50 thereof is thoroughly wetted by the introduced water upon entering the collector. To this end and with reference again to FIGS. 1 and 2, the system 22 includes a water supply 70, including a tank 71, which is connected to the collector ends 48 by way of an inlet conduit 72. As best shown in FIG. 1, the conduit 72 is provided with two branch conduits 72*a* and 72*b* which are joined to the collectors 38, 40 so that water which is introduced into each collector enters the collector substantially tangentially thereof along an interior wall. As will be apparent herein, the direction of the water introduced through the conduits 72*a*, 72*b* corresponds generally with the direction of movement of air along the interior wall of the collector. Water is forcibly moved along the inlet conduits 72 by way of a motor-driven pump 74 (FIG. 2) mounted adjacent the base of the supply tank 70. The flow rate of water through the conduit 72 can be controlled by appropriate adjustment of the speed of the pump 74 or by appropriate adjustment of control/shut-off valves 76, 78 mounted in the branch conduits 72*a*, 72*b* adjacent the collector ends 48. An additional conduit 84, within which is mounted a bleed valve 86, is joined to the inlet conduit 72 at a location downstream of the pump 74 to accommodate the bleeding or draining of water from the conduit 72.

Upon introduction of the water into each collector end 48 during operation of the fan 46 (so that water is introduced into the collector while dust and air is being drawn into the collector through the inlet 58 thereof), the water becomes entrained within the dust-laden air and transported along the collector within the induced air vortex. The majority of the water rotates about the longitudinal axis of the collector and is forced to sweep across the interior side of the collector inlet 58 in a swirling action and collide with the dust-laden air drawn into the collector through the inlet 58. This colliding of the water with the dust-laden air encapsulates a majority of the incoming dust particles within the water, and due to the centrifugal action within the body of the collector, a desired separation of much of the water from the airstream is effected within the collector. Moreover, the continual swirling action of the water across the collector inlet 58 as the water continues its general movement toward the collector end 50 continues to entrain dust of the incoming dust-laden air.

The aforedescribed movement of the air and water through the collector serves the purpose of wet-scrubbing the 25 dust-laden air moving through the collector and forces water to flow in a spiraling path, or swirl, along the interior walls of the collector for the entire length thereof. As used herein the term "wet-scrubbing" means to encapsulate dust particles with water for subsequent separation of the dust-laden water from the airstream. Consequently, upon arriving at the collector end 50 by way of the collector interior, most of the dust of the dust-laden air has been thoroughly wetted by the introduced water. Furthermore, the interior of the collector is continually rinsed by the movement of the water swirling along the walls of the collector with the air vortex so that the collector interior is thereby maintained in a relatively clean condition. The amount of water which is introduced into the collector at the end 48 thereof is coordinated with the flow of air drawn through the collector by the fan 46 so that the amount of introduced water is sufficient to thoroughly wet, or scrub, all of the dust-laden air transported along the collector before it exits the collector end 50 yet is not so large that the capacity of the collector to draw dust and air through the inlet 58 is appreciably affected.

With reference still to FIG. 2, there is situated within the ductwork 44 at a location immediately downstream of the collector ends 50 a drain port 90 through which much of the water which exits the collectors 38 and 40 can be drained. To this end, the port go is disposed at an elevation lower than that of the collector ends 50 and the remainder of the ductwork 44 so that water which is not entrained within the air/water mixture carried toward the fan 46 can be routed directly back to the supply tank 70 by way of a conduit 92.

To shower and thereby further saturate the wetted dust which exits the collector ends 50, another inlet conduit 94 is joined to the ductwork 44 at a location elevated above the collector ends 50 for introducing water, in a spray, into the ductwork 44 thereat. This conduit 94 is not connected to the pump 74, but receives water from another source, such as a utility supply, for providing the system 22 with make-up water through a valve 82. The water which is introduced into the ductwork 44 through the conduit 94 and which does not become entrained by the air moving toward the fan 46 is permitted to collect at the port 90 for subsequent draining from the ductwork 44.

Mounted within the ductwork 44 at a location situated further downstream of the collectors 38, 40 is a droplet separator unit 98 for separating the (dust-carrying) water from the air/water mixture moving toward the fan 46. The structure and operation of the separator unit 98 are well-known that a complete description of the unit 98 is not believed to be necessary. Suffice it to say that the unit 98 includes internal ductwork which possess a larger diameter than that of the ductwork 44 which leads to the unit 98 so as the air/water mixture enters the unit 98, its velocity is suddenly decreased and this reduction of velocity permits the water to fall out of the air and accumulate at the bottom of the unit 98. The air, which is rendered substantially water-free by the unit 98, continues to be drawn along the ductwork 44 and out of the unit 98 by the fan 46 for discharge into the environment—preferably outside of the papermaking plant. Water which collects in the bottom of the unit 98 can be drained to the supply tank 70 by way of discharge conduit 100 which extends between the bottom of the unit 98 and the top of the supply tank 70. It can be seen from the FIG. 2 view that due to the recirculation of water back to the supply tank 70 for re-introduction into the collector ends 48, a majority of the water of the system 22 operates in a closed-loop.

It follows that a system and process has been described which wet-scrubs the air which is drawn into the collectors 38 and 40 at the point of pick-up by introducing water into each collector at the end thereof opposite the low-pressure end of the collector. Moreover, the wet-scrubbing of the air is enhanced by the air vortex which is induced within each collector so that the interior walls of the collector are continually rinsed by the water introduced therein. Consequently, the interior of each collector is maintained in a relatively clean condition and the dust carried by the dust-laden air is wetted before it exits the collector for transport along the ductwork 44. Thus, the risk of ductwork fouling from an unwanted accumulation of dry dust within the ductwork 44 is substantially eliminated, and the need for frequent cleaning of the ductwork 44, as well as the collectors 38 and 40, is obviated. Furthermore, because dust which is transported along the ductwork 44 in an air/water mixture is wet, rather than dry, the risk of a fire being ignited within or propagating throughout the ductwork 44 by virtue of an accumulation of dry dust is prevented. Consequently, the need for costly fire prevention equipment is obviated. Further still, because the dust-laden air is thoroughly wet-scrubbed upon entry into the collectors, there is no need to employ wet-scrubbing equipment downstream of the collectors. Instead and as exemplified by the system 22, a less-costly droplet separator can be employed for separating water from the air/water mixture.

It will be understood that numerous modifications and substitutions can be had to the aforedescribed embodiments without departing from the spirit of the invention. For example, although the aforedescribed system 22 includes two collectors 38 and 40 have been shown and described as being positioned either directly above the moving web 28 for drawing dust from the web surface or directly beneath the canopy hood 36 for drawing the dust-laden air confined within the area 32, a system in accordance with the broader aspects of the present invention can employ an alternative number of collectors (e.g. one, three or more) and these collectors can be disposed at sites or locations other than those described in connection with the collectors 38 or 40. For example, a collector can be positioned immediately beneath the web 28 of moving paper for drawing dust from the downwardly-facing surface of the web 28. Further still, a vacuum can be pulled within a collector by way of the vacuum-generating source or the water can be introduced into the collector interior at locations other than at the ends of the collector.

Yet further, although the water supply 70 of the system 22 has been shown and described as including a supply tank 71, water can be supplied to the papermachine room for introduction into the collectors directly from a municipal utility source. In such an open-loop operation, water which is drained from the port 90 or the separator unit 98 may be discarded, rather than re-circulated through the system. Accordingly, the aforedescribed embodiments are intended for the purpose of illustration and not as limitation.

What is claimed is:

1. A process for collecting and handling dust in a papermaking environment comprising the steps of:
    providing an elongated collector having an inlet, an exit opening and a longitudinal axis;
    drawing dust-laden air into the inlet of the collector and inducing an air vortex which flows between the inlet and exit opening of the collector wherein the air vortex is centered about the longitudinal axis of the collector and is formed with the dust-laden air drawn into the collector and
    introducing water into the collector so that the introduced water wet-scrubs the dust-laden air which enters the collector by colliding with the dust-laden air upon entry of the air into the collector so that the water becomes entrained within the dust-laden air and is carried along the collector with the dust-laden air between the inlet and the exit opening of the collector and so that the dust of the dust-laden air is exposed to and mixes with the water moving along the collector from the moment that the dust-laden air enters the collector until the moment that the air exits the collector through the exit opening.

2. The process as defined in claim 1 wherein the air vortex is induced within the source by way of a vacuum-generating source connected to the exit opening of the collector and wherein the collector cooperates with the vacuum-generating source to create a turbulent flow of air moving through the collector along the air vortex so that the water which is introduced into the collector during the introducing step is subsequently carried with the turbulent flow of air into collision with dust-laden air drawn into the collector.

3. The process as defined in claim 2 wherein the collector has an interior, and the air of the turbulent flow created by has the cooperation between the collector and the vacuum-generating source is subsequently carried by the turbulent flow of air across the collector inlet and so that the dust of the dust-laden air collides with the introduced water upon entry of the dust-laden air through the collector inlet.

4. The process as defined in claim 3 wherein the collector has interior walls which are rounded in shape, and the inlet of the collector opens into the interior of the collector so that dust-laden air which is drawn into the collector inlet is moved by the vacuum-generating source substantially tangentially along an interior wall of the collector.

5. The process as defined in claim 4 wherein the collector includes a V-shaped inlet portion having two legs which are joined at an apex which is directed inwardly of the collector, and the collector inlet is provided by an opening which extends along the length of one of the legs of the V-shaped inlet portion.

6. The process as defined in claim 3 wherein the introducing steps effects the introduction of water into the collector substantially tangentially along one interior wall of the collector and in a direction which generally corresponds with the direction of air flow across the one interior wall.

7. The process as defined in claim 1 wherein the elongated collector has two opposite ends, and the vacuum-generating source is connected to one end of the collector for drawing a vacuum from said one end thereof.

8. The process as defined in claim 7 wherein the water which is introduced into the collector during the introducing step is introduced therein at the end of the collector opposite said one end.

9. The process as defined in claim 1 wherein the collector has an exit opening, and the amount of water which is introduced within the collector during the introducing step is large enough so that upon exiting of the collector through the exit opening, the dust-laden air has been thoroughly wet-scrubbed by the introduced water.

10. A process for collecting and handling dust in a papermaking environment comprising the steps of:
    providing an elongated collector having an inlet, an exit opening and a longitudinal axis;
    utilizing a vacuum-generating source to draw dust-laden air into the inlet of the collector so that an air vortex is induced with the dust-laden air wherein the air vortex flows between the collector inlet and the collector exit opening and is centered about the longitudinal axis of the collector; and
    introducing water into the collector so that the introduced water collides with the dust-laden air upon entry of the air into the collector and thereby becomes entrained within the vortex of air flowing through the collector and is subsequently carried along the collector with the dust-laden air between the inlet and the exit opening of the collector and so that dust of the dust-laden air is exposed to and mixes with the water moving along the collector from the moment that the dust-laden air enters the collector until the dust-laden air exits the collector through the exit opening so that the dust-laden air is thoroughly wet-scrubbed upon exiting the collector.

11. In a dust-handling system for collecting and handling dust in a papermaking environment wherein dust-laden air is drawn into and moves along an elongated collector by way of a vacuum-generating source connected to the collector, and wherein the elongated collector includes an inlet through which the dust-laden air is drawn into the collector, an exit opening and a longitudinal axis, the improvement comprising:

the inlet of the collector is disposed in such a relation to the longitudinal axis of the collector so that upon drawing the dust-laden air into the inlet of the collector, an air vortex is induced with the dust-laden air wherein the induced air vortex flows between the collector inlet and the collector exit opening and is centered about the longitudinal axis of the collector; and means for introducing water into the collector so that the introduced water wet-scrubs the dust-laden air which enters the collector by colliding with the dust-laden air upon entry of the air into the collector inlet so that the water becomes entrained within the dust-laden air and is carried along the collector with the dust-laden air and between the inlet and the exit opening of the collector and so that the dust of the dust-laden air is exposed to and mixes with the water moving through the collector from the moment that the dust-laden air enters the collector until the moment that the air exits the collector through the exit opening.

12. The improvement as defined in claim 11 wherein the vacuum-generating means is adapted to draw dust-laden air into the connector by way of the exit opening and wherein the collector cooperates with the vacuum-generating source to create a turbulent flow of air moving through the collector and along the induced air vortex so that the water which is introduced into the collector by the water-introducing means is carried with the turbulent flow of air into collision with dust-laden air drawn into the collector.

13. The improvement as defined in claim 12 wherein the collector has an interior, and the air of the turbulent flow created by the cooperation between the collector and the vacuum-generating source is carried by the turbulent flow of air across the collector inlet and so that the dust of the dust-laden air collides with the introduced water upon entry of the dust-laden air through the collector inlet.

14. The improvement as defined in claim 13 wherein the collector has interior walls which are rounded in shape, and the inlet of the collector opens into the interior of the collector so that dust-laden air which is drawn into the collector inlet is moved by the vacuum-generating source substantially tangentially along an interior wall of the collector.

15. The improvement as defined in claim 14 wherein the collector includes a V-shaped inlet portion having two legs which are joined at an apex which is directed inwardly of the collector, and the collector inlet is provided by an opening which extends along the length of one of the legs of the V-shaped inlet portion.

16. The improvement as defined in claim 14 wherein the means for introducing is adapted to introduce water into the collector substantially tangentially along one interior wall of the collector and in a direction which generally corresponds with the direction of air flow across the one interior wall.

17. The improvement as defined in claim 13 wherein the collector includes a plurality of spaced rods having two opposite ends and which are supported forwardly of the inlet of the collector for preventing broke or another large piece of debris from entering the inlet of the collector, and one end of each rod remains free from contact with the remainder of the collector so that the broke or another large piece of debris which is prevented from entering the collector inlet by the rods is permitted to fall from, rather than collect upon, the free ends of the rods.

18. The improvement as defined in claim 11 wherein the elongated collector has two opposite ends, and the vacuum-generating source is connected to one end of the collector for drawing a vacuum from said one end thereof.

19. The improvement as defined in claim 18 wherein the means for introducing water into the collector is adapted to introduce water into the collector through the end of the collector opposite said one end.

* * * * *